(12) United States Patent
Fischer et al.

(10) Patent No.: US 7,278,190 B2
(45) Date of Patent: Oct. 9, 2007

(54) TWO COMPONENT FUEL AND BRAKE LINE CLIP

(75) Inventors: Charles K. Fischer, Grant Township, MI (US); Roger E. Pilon, Avoca, MI (US); Zdravko Kovac, Chesterfield, MI (US)

(73) Assignee: Newfrey LLC, Newark, DE (US)

( * ) Notice: Subject to any disclaimer, the term of this patent is extended or adjusted under 35 U.S.C. 154(b) by 67 days.

(21) Appl. No.: 10/876,754

(22) Filed: Jun. 25, 2004

(65) Prior Publication Data

US 2005/0000061 A1    Jan. 6, 2005

Related U.S. Application Data

(60) Provisional application No. 60/484,715, filed on Jul. 3, 2003.

(51) Int. Cl.
*F16B 15/00* (2006.01)

(52) U.S. Cl. ............... 24/530; 24/555; 24/564; 248/74.2

(58) Field of Classification Search ............... 248/68.1, 248/69, 74.1–74.3; 24/530, 564, 555
See application file for complete search history.

(56) References Cited

U.S. PATENT DOCUMENTS

| | | | | |
|---|---|---|---|---|
| 2,355,742 A | * | 8/1944 | Morehouse | ............... 248/68.1 |
| 4,270,250 A | * | 6/1981 | Schon | ............... 24/114.5 |
| 4,612,680 A | * | 9/1986 | Daiguji | ............... 14/22 |
| 4,881,705 A | | 11/1989 | Kraus | |
| 5,002,243 A | | 3/1991 | Kraus et al. | |
| 5,033,701 A | | 7/1991 | Kraus | |
| 5,170,984 A | | 12/1992 | Rickwardt | |
| 5,257,768 A | | 11/1993 | Juenemann et al. | |
| 5,316,245 A | | 5/1994 | Ruckwardt | |
| 5,398,907 A | * | 3/1995 | Kelchner | ............ 248/634 |
| 5,464,179 A | | 11/1995 | Ruckwardt | |
| 5,954,300 A | | 9/1999 | Sturies et al. | |
| 6,264,393 B1 | | 7/2001 | Kraus | |
| 6,669,150 B2 | * | 12/2003 | Benoit et al. | ............ 248/74.2 |
| 6,926,237 B2 | * | 8/2005 | Shereyk et al. | ............ 248/71 |

FOREIGN PATENT DOCUMENTS

| | | |
|---|---|---|
| EP | 0230553 | 5/1987 |
| WO | WO02079682 | 10/2002 |

* cited by examiner

*Primary Examiner*—James R. Brittain
(74) *Attorney, Agent, or Firm*—Harness, Dickey & Pierce, P.L.C.

(57) ABSTRACT

A two component line clip for fixing a line therein includes a body defining an aperture. The body is formed from a material having a first hardness. The aperture is defined in part by a rib. An insert is secured within the aperture. The insert is formed from a material having a second hardness less than the first hardness. The insert includes a feature that cooperates with the rib to secure the insert within the aperture. The insert is adapted to fix the line therein.

13 Claims, 2 Drawing Sheets

TWO COMPONENT FUEL AND BRAKE LINE CLIP

CROSS-REFERENCE TO RELATED APPLICATIONS

This application claims the benefit of U.S. Provisional Application No. 60/484,715, filed on Jul. 3, 2003. The disclosure of the above application is incorporated herein by reference.

FIELD OF THE INVENTION

The present invention relates to line clips and more particularly to a two component fuel and brake line clip

BACKGROUND OF THE INVENTION

Line clips are used in many applications to secure a line or tube such that it is restrained from freely moving relative to the line clip. One common example of a line clip is a fuel and brake line clip used in many mobile platforms. This fuel and brake line clip is typically made from a hard material that is secured to the mobile platform. Fuel and brake lines are then secured by the line clip to prevent the lines from freely moving and potentially contacting a hot surface or moving part and damaging the line.

While these line clips have been useful for their intended purpose, there are limitations. First, the hard material of the line clip, while necessary to provide a secure and tough fastener, may transmit noise, vibration, and harshness (NVH) therethrough. This in turn may eventually pull the fuel or brake line from its end connectors. Second, the line clip, while adequate for securing the line from lateral movement, does not prevent the line from rotating within the line clip nor moving in an axial direction. Again, these movements may lead to decoupling of the line at its ends. Accordingly, the present invention seeks to provide a line clip that not only reduces NVH transmission, but also fully secures a line therein.

SUMMARY OF THE INVENTION

A two component line clip for fixing a line therein includes a body defining an aperture. The body is formed from a material having a first hardness. The aperture is defined in part by a rib. An insert is secured within the aperture. The insert is formed from a material having a second hardness less than the first hardness. The insert includes a feature that cooperates with the rib to secure the insert within the aperture. The insert is adapted to fix the line therein.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
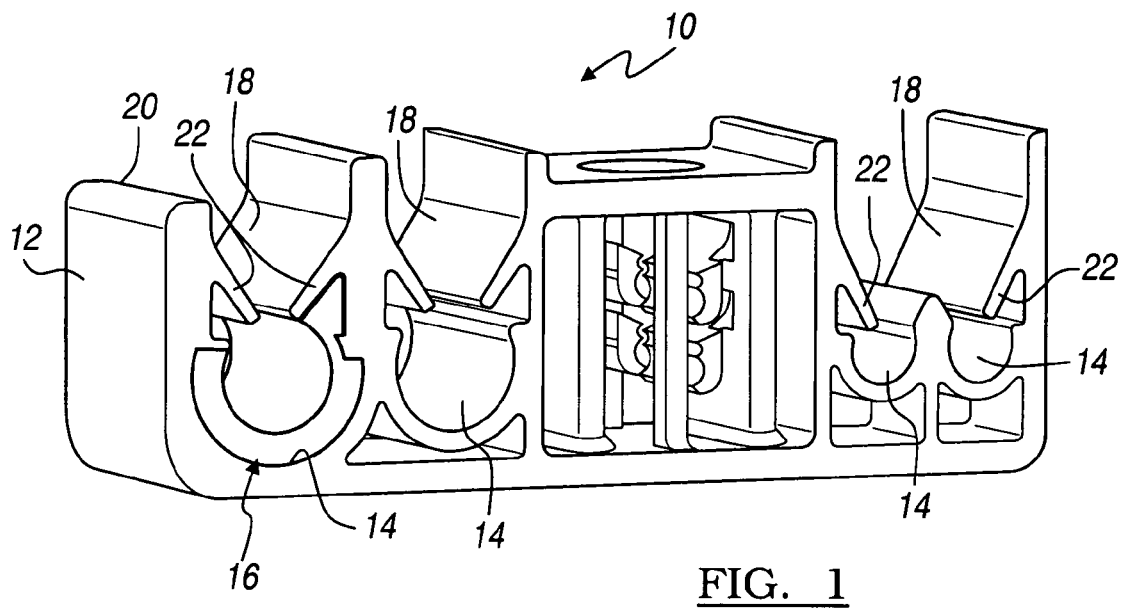
FIG. 1 is a front perspective view of a two component line clip constructed according to the principles of the present invention.

With reference to FIG. 1, a two component line clip constructed according to the principles of the present invention is generally indicated by reference numeral 10. In the particular example provided, the line clip 10 is illustrated as a fuel and brake line clip for use in motor vehicles or other vehicular platforms. However, it should be appreciated that the line clip 10 may be employed in any number of applications, ranging from such areas as complex wiring arrangements in computer systems to simple line fastening in home environments.

The line clip 10 generally includes a body 12 that defines an aperture 14 and an insert 16 within the aperture 14. The body 12 is formed as a single unitary unit from a first material. For example, the body 12 may be formed from thermoplastic, nylon, or any other polymer.

In the context of a fuel and brake line clip, the body 12 defines four apertures 14 that extend therethrough. The apertures 14 are arranged in series along the length of the body 12. It should be appreciated that the line clip 10 may include any number of apertures 14 formed therethrough without departing from the scope of the invention.

The body 12 further defines a notch 18 that extends from a top surface 20 of the body 12 into the aperture 14. In the particular example provided, there are four notches 18 formed in the line clip 10 that extend into each aperture 14. Moreover, the notches 18 are generally v-shaped, though various other shapes may be employed. The notch 18 includes at least one deformable tab 22 that extends out from the body 12 near the boundary between the notch 18 and the aperture 14. A line (not shown) is inserted into the notch 18 and deflects the tab 22. Once the line enters the aperture 14, the tab 22 returns to its original non-deflected position and operates to secure the line within the aperture 14. Typically, one tab 22 will deflect more than another as one tab 22 has more room to deflect while the other contacts the insert 16.

Figure 2:
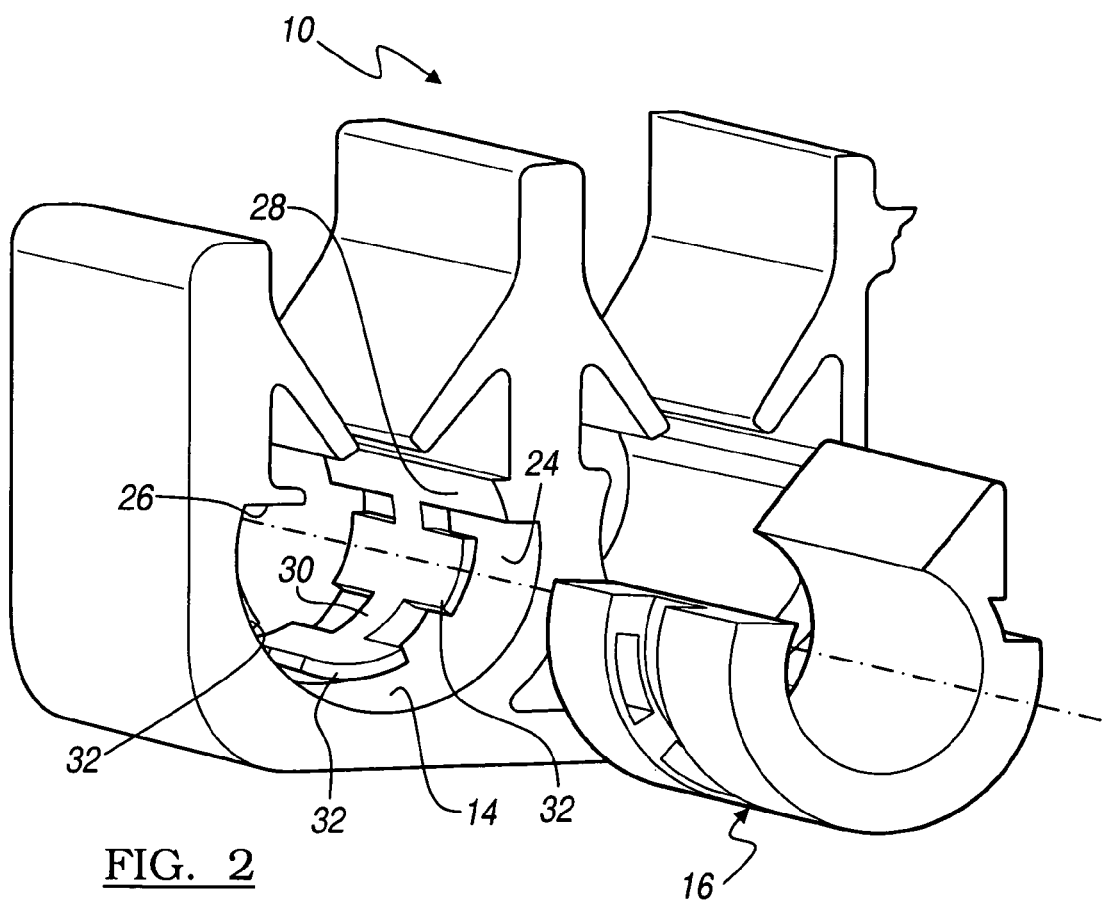
FIG. 2 is a front perspective view of the two component line clip having an insert removed therefrom.

Turning to FIG. 2, the aperture 14 is defined by a plurality of surfaces and features formed in the body 12 that operate to interact with the insert 16 to secure the insert 16 within the aperture 14. In the example provided, the aperture 14 is defined by a generally cylindrical inner surface 24. A wall 26 is formed at an end of the inner surface 24. As will be described below, the wall 26 cooperates with a portion of the insert 16 to secure the insert 16 within the aperture 14. The aperture 14 is further defined by a rib 28 that extends from the inner surface 24 axially along the length of the aperture 14. As will also be described below, the rib 28 cooperates with a groove in the insert 16 to secure the insert 16 within the aperture 14.

Finally, the aperture 14 is defined by a circumferential rib 30 formed on the inner surface 24. The circumferential rib 30 extends along the circumference of the inner surface 24 from the wall 26 to the rib 28. The circumferential rib 30 includes a plurality of alternating flanges 32 that extend axially out from each side of the circumferential rib 30. In the particular example provided, the circumferential rib 30 includes three flanges 32 extending outwards therefrom on each side thereof. It should be appreciated, however, that any number of flanges 32 may be employed. Each flange 32 cooperates with a portion of the insert 16, as will be described below, to secure the insert 16 within the aperture 14.

Figure 3A:
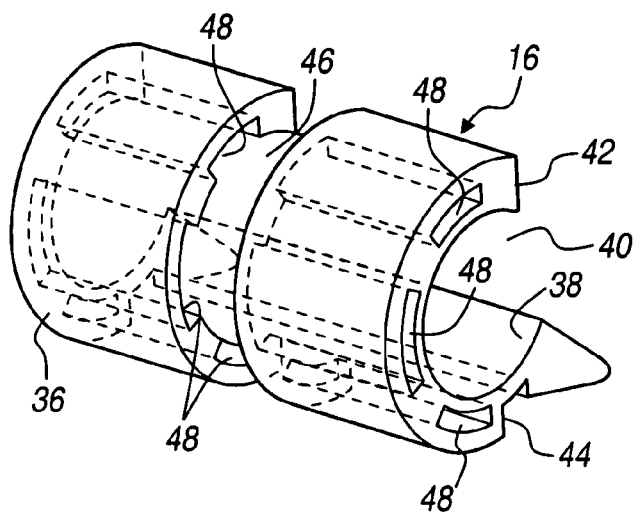
FIG. 3A is a first perspective view of the insert of FIG. 2.
Figure 3B:
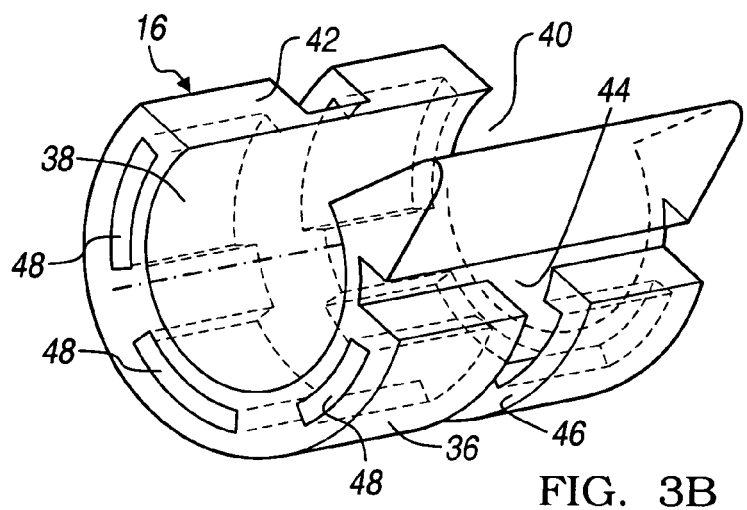
FIG. 3B is a second perspective view of the insert of FIG. 2.

With reference to FIGS. 3A and 3B, the insert 16 will now be described in detail. The insert 16 is made from a second material having a hardness less than the hardness of the first material of the body 12 (FIGS. 1 and 2). For example, the second material may be neoprene, rubber, any soft thermoplastic polymer, etc.

The insert 16 includes a generally cylindrical body 36 sized to match the inner surface 24 of the aperture 14 (FIGS. 1 and 2). The body 36 defines an inner bore 38. The inner bore 38 is sized to receive and secure a brake fluid line or electrical cable (not shown) therein. The body 36 further defines a cutout 40 that extends into the inner bore 38, thereby giving the cylindrically shaped body 36 a "c" shape. The cutout 40 allows a line to be slipped within the inner bore 38. The inner bore 38 secures a line (not shown) therein from moving axially, laterally, and rotationally using surface friction of the inner bore. Alternatively, a line may be secured within the inner bore 38 using a chemical adhesive or other such bonding agent.

The body 36 further includes a flat face 42 formed at an end of the inner bore 38. The flat face 42 is coplanar with the wall 26 (FIG. 2) formed in the aperture 14. The flat face 42 engages the wall 26 (FIG. 2) of the aperture 14 to help secure the insert 16 within the aperture 14. An axial groove 44 is formed in the body 36 of the insert 16 and extends the length of the insert 16. The axial groove 44 is sized to receive the rib 28 (FIG. 2) of the aperture 14 therein and also acts to secure the insert 16 within the aperture 14. A circumferential groove 46 is formed along the outer circumference of the body 36 of the insert 16 and cooperates with the circumferential rib 30 (FIG. 2) of the aperture 14 to secure the insert 16 within the aperture 14. Furthermore, slots 48 extend from the circumferential groove 46 into the body 36. Each slot 48 encases a flange 32 (FIG. 2) of the circumferential rib 30 of the aperture 14. Accordingly, in the example provided, there are a total of six slots 48, one for each of the three flanges 32 formed on each side of the circumferential rib 30. Should the insert 16 fracture during use, the flanges 32 act to keep the insert 16 disposed within the aperture 14.

The line clip 10 is preferably formed by a two-stage injection molding process. For example, the body 12 is first formed from the first material using conventional injection molding methodologies. Then, the body 12 is placed in a second mold (not shown) and the insert 16 is formed within the aperture 14 using a second material that is softer than the first material. It should be appreciated, however, that various other methods may be employed to form the line clip 10 other than a two-stage injection molding process.

The hard body 12 of the line clip 10 secures the line clip to its intended environment and protects the softer insert 16 from damage. Meanwhile, the soft material of the insert 16 provides an "intimate" contact (e.g., increased friction) with a line (not shown) inserted within the line clip 10. This "intimate" contact prevents the line from being moved relative to the line clip 10 either axially or rotationally, thus securing the line in more than one direction. Moreover, the soft material of the insert 16 serves to eliminate or reduce noise, vibration, and harshness transmitted between the body 12 and the line.

Figure 4:
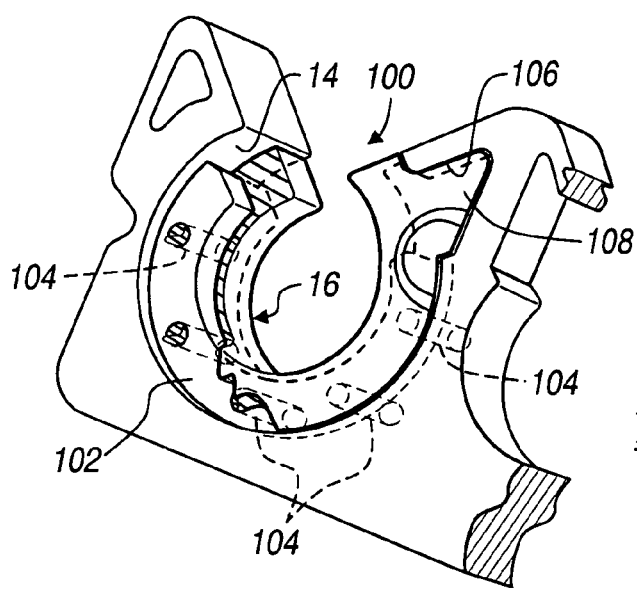
FIG. 4 is a front perspective view with of a second two component line clip constructed according to the principles of the present invention having a portion of an insert used therein cut away.

Turning now to FIG. 4, a second two component line clip is generally indicated by reference numeral 100. Again, the line clip 100 is illustrated as a fuel and brake line clip, however, the line clip 100 may be used in various other environments and applications. The line clip 100 is substantially similar to the line clip 10 in FIGS. 1 and 2, however, the aperture 14 is defined by a central circumferential ring 102 formed therein. A plurality of holes 104 are formed through the circumferential ring 102. As the insert 16 is formed within the aperture 14 during the two stage molding process, the softer material of the insert flows through the holes 104 and completely covers the circumferential ring 102, thus securing the insert 16 to the body 12 of the line clip 100.

The body 12 of the line clip 100 further includes a notch 106 formed therein. The notch 106 is generally triangularly shaped. The insert 16 includes a matching wing 108 that fits within the notch 106 and is likewise generally triangularly shaped. The notch 106 and wing 108 operate to further secure the insert 16 within the aperture 14.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A two component line clip for fixing a line therein comprising:

a body defining an aperture, the body formed from a material having a first hardness, the aperture defined in part by a circumferential rib formed along an inner surface of the aperture;

an insert secured within the aperture, the insert formed from a material having a second hardness less than the first hardness, the insert including a feature that is configured to interface with the circumferential rib to secure the insert within the aperture, wherein the insert is adapted to fix the line therein; and wherein the circumferential rib includes a plurality of flanges extending axially outward from the circumferential rib in a first direction and parallel to the inner surface of the aperture, the flanges cooperating with a slot formed in the insert to secure the insert within the aperture.

2. The two component line clip of claim 1, wherein the rib extends axially within the aperture.

3. The two component line clip of claim 2, wherein the insert includes an axially extending groove that cooperates with the rib to secure the insert within the aperture.

4. The two component line dip of claim 1, wherein the insert at least partially covers the rib.

5. The two component line clip of claim 1, wherein the insert Is injection molded overtop the body within the aperture.

6. The two component line clip of claim 1, wherein the body is formed from plastic and the insert is formed from rubber.

7. The two component line clip of claim 1, further defining a notch extending through the body and insert into the aperture for receiving and securing a line therein.

8. The two component line, dip of claim 7, wherein the notch is generally "v" shaped and includes at least one deformable tab for securing a line within the insert.

9. A two component line clip for fixing a fuel or brake line therein comprising:
- a body defining a first aperture, the body formed from a material having a first hardness, the first aperture defined in part by a circumferential rib and an axial rib, the circumferential rib having a plurality of flanges extending axially outward from the circumferential rib, from a side thereof in a first direction, to be parallel to a second aperture, with the second aperture radially disposed between at least two of the plurality of flanges;
- an insert secured within the first aperture, the insert formed from a material having a second hardness less than the first hardness, the insert having a circumferential groove and an axial groove configured to interface with the circumferential rib and axial rib of the body, the insert defining a slot for receipt of the flanges, to couple the insert to the first aperture, the insert at least partially covering the first aperture; and
- a notch defined by the body and inserted into the first aperture for receiving and securing a line therein.

10. The two component line clip of claim 9, wherein the first aperture defines a wall and the insert includes a flat face coplanar to the wall, the flat face configured to interface with the wall to secure the insert within the first aperture.

11. The two component line clip of claim 9, wherein the notch is generally "v" shaped and includes at least one deformable tab for securing a line within the insert.

12. A two component line clip for fixing a fuel or brake line therein comprising:
- a body having a deformable tab and defining a first aperture, the first aperture defined in part by a circumferential rib and an axial rib, the circumferential rib having a first plurality of flanges extending axially outward from a side of the circumferential rib in a first axial direction to be parallel to at least one second aperture, with the second aperture radially disposed between at least two of the first flanges;
- an insert secured within the first aperture, the insert defining a circumferential groove and an axial groove configured to interface with the circumferential rib and axial rib of the body, the insert further defining a plurality of slots for receipt of the first flanges in the first axial direction to couple the insert to the first aperture; and
- wherein said deformable tab is operable to secure the line in the first aperture.

13. The two component line clip of claim 12, further comprising:
- a second plurality of flanges extending axially outward from the side of the circumferential rib in a second axial direction to be parallel to at least one third aperture, with the third aperture radially disposed between at least two of the second flanges; and
- wherein the insert includes a plurality of slots for receipt of the second flanges in the second axial direction to couple the insert to the first aperture.

* * * * *

UNITED STATES PATENT AND TRADEMARK OFFICE
CERTIFICATE OF CORRECTION

PATENT NO. : 7,278,190 B2 Page 1 of 1
APPLICATION NO. : 10/876754
DATED : October 9, 2007
INVENTOR(S) : Charles K. Fischer et al.

It is certified that error appears in the above-identified patent and that said Letters Patent is hereby corrected as shown below:

Title Page,
Item [56] References Cited, U.S. PATENT DOCUMENTS, "5,170,984", "Rickwardt" should be -- Rückwardt --.

Column 4,
Line 54, "dip" should be -- clip --.
Line 56, "Is" should be -- is --.
Line 65, "line, dip" should be -- line clip --.

Signed and Sealed this

Twenty-second Day of July, 2008

JON W. DUDAS
*Director of the United States Patent and Trademark Office*